June 16, 1931.  W. S. JAMES  1,809,973

BRAKE OPERATING MEANS

Filed June 17, 1929

INVENTOR.
William S. James
BY P. M. Pomeroy
ATTORNEY

Patented June 16, 1931

1,809,973

UNITED STATES PATENT OFFICE

WILLIAM S. JAMES, OF SOUTH BEND, INDIANA, ASSIGNOR TO THE STUDEBAKER CORPORATION, OF SOUTH BEND, INDIANA, A CORPORATION OF NEW JERSEY

BRAKE OPERATING MEANS

Application filed June 17, 1929. Serial No. 371,473.

This invention relates to brake operating means for brakes mounted upon vehicle wheels which have pivotal axles, as for example the front wheels of motor vehicles.

The principal object of the invention is to provide a construction which will not interfere with the free turning or pivoting of the wheel and in which the braking reaction is obtained independently of the axle pivot.

A further object of the invention is to provide a brake operating shaft which extends through the vehicle axle in substantial alignment with the wheel pivot and which has an arm extending therefrom engageable with brake operating means on substantially the axis of the wheel pivot.

These being among the objects of the present invention the same consists of certain features of construction and combination of parts to be hereinafter described with reference to the accompanying drawing, and then claimed, having the above and other objects in view.

In the accompanying drawings which illustrate a suitable embodiment of the present invention, Figure 1 is a vertical sectional view taken through the left front wheel of a motor vehicle, certain parts being in full lines to more clearly illustrate the invention.

Figure 1:
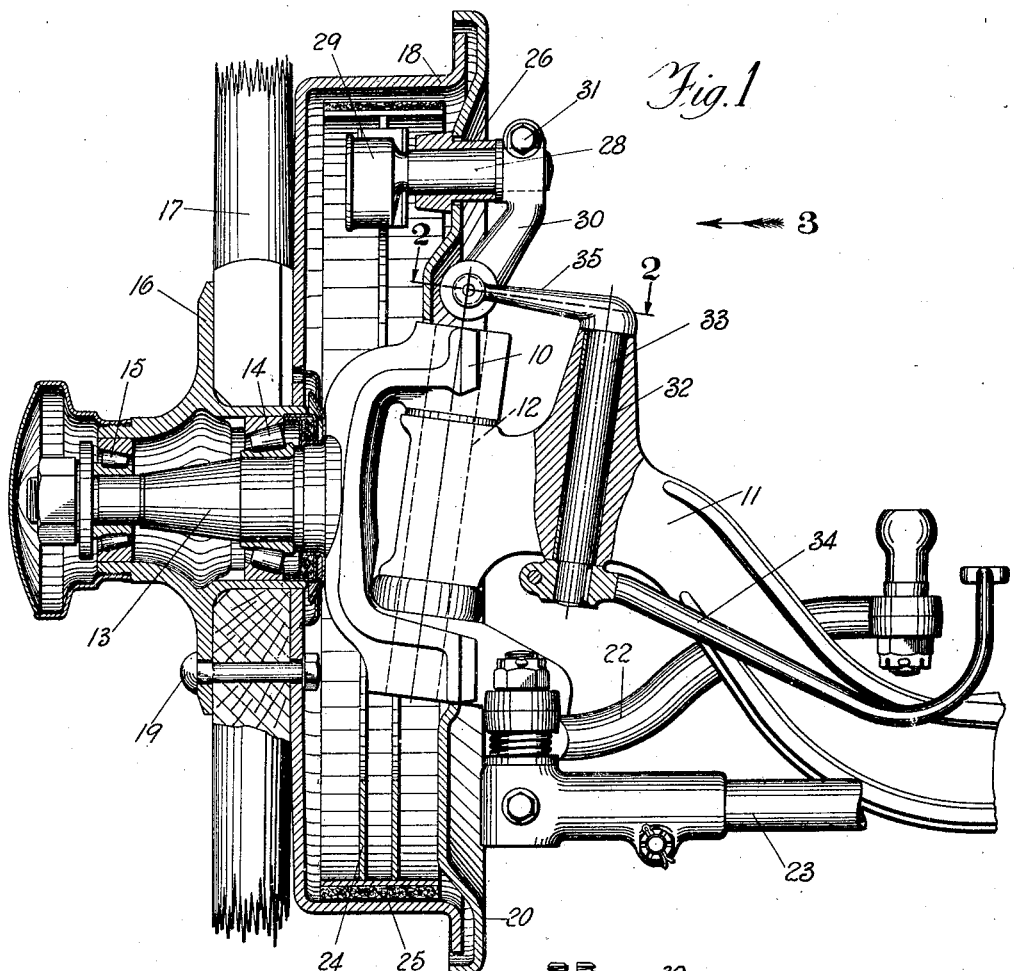
Figure 2:
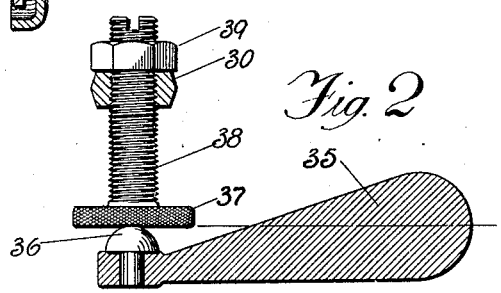
Figure 2 is a sectional view taken on the line 2—2 of Figure 1 showing the brake operating arm in engagement with the lever on the cam operating shaft.

Referring to the accompanying drawings in which like numerals refer to like parts throughout the several views, a steering knuckle 10 is pivotally mounted on a vehicle front axle 11 by the king pin 12 and has an outwardly extending stub axle or spindle 13 formed thereon. The spindle 13 carries bearings 14 and 15 which rotatably support a wheel hub 16 to which a vehicle wheel 17 and a brake drum 18 are concentrically secured by bolts 19. A brake drum dust cover 20 is rigidly attached to the steering knuckle 10 by means of the bolts 21 in adjacent relationship to the brake drum 18 to exclude as much dirt and the like therefrom as possible.

An arm 22 attached to the steering knuckle 10 provides means by which the wheel 17 can be pivoted on the king pin 12. A reach rod 23 is also connected with the steering knuckle 10 to provide means by which the right front wheel of the vehicle may be turned in unison with the left front wheel. As the brake operating means for both wheels of the vehicle is the same, I have illustrated only the means for operating the left front wheel brake.

Concentrically arranged within the drum 18 is a brake 24 which may be either a plurality of brake shoes or a split expandable band, the particular design of brake being immaterial to my invention. The braking member 24 is faced with a suitable friction material 25 adapted to be expanded into engagement with the drum 18 by means to be hereinafter described.

A hollow support 26 extending through the dust cover 20 is secured thereto by the bolts 27 and has extending therethrough a rock shaft 28 having a cam 29 on the inner end thereof adapted to expand the brake 24 into engagement with the drum 18. A lever 30 secured against rotation on the shaft 28, as by means of the lock bolt 31, extends downwardly therefrom as is clearly shown in Figure 1.

Figure 3:
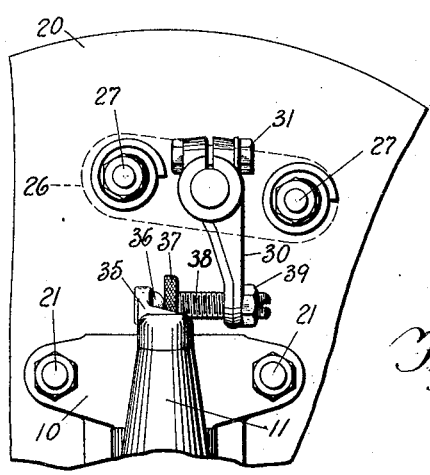
Figure 3 is a fragmentary side elevation looking in the direction of the arrow 3 of Figure 1.

The axle 11 has an opening 32 therethrough extending substantially parallel to the longitudinal axis of the king pin 12. A rock shaft 33 extends through the opening 32 and has an arm 34 rigidly secured adjacent to the lower end thereof by means of which the shaft 33 may be rotated. The shaft 33 is provided with an arm 35 at its upper end extending substantially perpendicular thereto toward the wheel pivot into approximate alignment with the longitudinal axis of the king pin 12. The arm 35 is preferably provided with a round headed contact member 36 engaging with the head 37 of an adjusting screw 38 threaded into the arm 30 and held against movement thereon by means of the lock nut 39. The screw 38 is preferably adjusted so that the contact member 36 engages with the head 37 thereof in substantial alignment with the longitudinal axis of the king pin 12 when the brake is in inoperative position, as is clearly shown in Figures 1 and 3.

By positioning the adjusting screw 38 to contact with the member 36 on the arm 35 in the manner just described, the wheel 17 can be turned on the king pin 12 without in any way causing the brake to be operated upon the turning of the steering wheel. It is also apparent that the arm 34 can be operated to turn the shaft 33 in its support in the axle 11 to thus move the arm 35 and cause the lever 30 to rock the shaft 28 whereby the cam 29 mounted thereon will cause the brake element 24 to engage with the drum 18 when the wheel 17 is in any desired pivotal position.

In the foregoing description, it will be seen that the wheel can be turned on its pivot without affecting the brake applying means and that the brake can be applied when the wheel is turned on its pivot without causing binding of the brake operating means or cause undue wear of the same.

Formal changes may be made in the specific embodiment of the invention without departing from the spirit and substance of the broad invention the scope of which is commensurate with the appended claims.

What I claim is:

1. In a steering wheel brake mechanism, a rotatable drum, braking means engageable therewith, a shaft having means thereon operable to move said braking means into engagement with said drum, a lever secured to said shaft, a contact member having its longitudinal axis extending substantially perpendicular to the longitudinal axis of said shaft adjustably supported in said lever, a shaft journaled substantially parallel to the pivoted axis of said wheel having an arm extending therefrom engageable with said contact member, and means for rotating said last named shaft to engage said braking means with said drum.

2. In a steering wheel brake mechanism, an axle, a wheel pivotally and rotatably mounted thereon, a brake drum rotatable with said wheel, braking means engageable with said drum, a backing plate adjacent to said brake drum, a shaft rotatably supported in said backing plate having means thereon operable to move said braking means into engagement with said drum, a lever secured to said shaft, a contact member adjustably supported in said lever, a second shaft journaled in said axle extending substantially parallel to the pivotal axis of said wheel, an arm on said second shaft engageable with said contact member, and means on said second shaft at the end opposite said arm for rotating said shaft to engage said braking means with said drum.

3. The combination with an axle provided with a spindle pivotally connected thereto having a wheel mounted thereon, of a brake drum on said wheel, braking means engageable with said drum supported by said spindle, means to engage said braking means with said drum, a lever secured to said last named means, a shaft extending through said axle having an arm thereon at one end thereof engaging said lever, and means on said shaft at the end opposite said arm for rotating said shaft to engage said braking means with said drum.

4. The combination with an axle provided with a spindle pivotally connected thereto having a wheel mounted thereon, of a brake drum on said wheel, braking means engageable with said drum supported by said spindle, means supported by said spindle operable to engage said braking means with said drum, a lever secured to and depending from said last named means, a shaft substantially parallel with said spindle pivot extending through said axle, an arm on one end of said shaft engageable with said lever in substantial alignment with said spindle pivot, and means on said shaft at the end opposite said arm for rotating said shaft to engage said braking means with said drum.

Signed by me at South Bend, Indiana, this 13th day of June, 1929.

WILLIAM S. JAMES.